United States Patent
Kuriyama

(10) Patent No.: US 10,417,163 B2
(45) Date of Patent: Sep. 17, 2019

(54) ELECTRONIC DEVICE

(71) Applicant: Sony Corporation, Tokyo (JP)

(72) Inventor: Hideaki Kuriyama, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/752,089

(22) PCT Filed: Jul. 4, 2016

(86) PCT No.: PCT/JP2016/003171
§ 371 (c)(1),
(2) Date: Feb. 12, 2018

(87) PCT Pub. No.: WO2017/037983
PCT Pub. Date: Mar. 9, 2017

(65) Prior Publication Data
US 2018/0239733 A1    Aug. 23, 2018

(30) Foreign Application Priority Data

Sep. 3, 2015   (JP) ................................ 2015-173568

(51) Int. Cl.
| | |
|---|---|
| *H05K 5/00* | (2006.01) |
| *G06F 13/40* | (2006.01) |
| *G11B 33/08* | (2006.01) |
| *G11B 33/12* | (2006.01) |
| *G11B 33/14* | (2006.01) |
| *G06F 1/18* | (2006.01) |

(52) U.S. Cl.
CPC .......... *G06F 13/4068* (2013.01); *G06F 1/181* (2013.01); *G06F 1/187* (2013.01); *G11B 33/08* (2013.01); *G11B 33/128* (2013.01); *G11B 33/142* (2013.01)

(58) Field of Classification Search
CPC ....................................................... H05K 5/00
See application file for complete search history.

(56) References Cited

U.S. PATENT DOCUMENTS

| | | | |
|---|---|---|---|
| 7,471,509 B1 * | 12/2008 | Oliver | G11B 25/043 312/223.2 |
| 8,743,549 B2 | 6/2014 | Frink et al. | |

(Continued)

FOREIGN PATENT DOCUMENTS

| | | |
|---|---|---|
| AU | 2012230989 A1 | 10/2013 |
| AU | 2015238911 A1 | 10/2015 |

(Continued)

OTHER PUBLICATIONS

International Search Report and Written Opinion of PCT Application No. PCT/JP2016/003171, dated Oct. 4, 2016, 9 pages.

*Primary Examiner* — Jerry Wu
(74) *Attorney, Agent, or Firm* — Chip Law Group

(57) ABSTRACT

There is provided an electronic device that includes a plurality of disk drive units, a housing, a connection member, and a damping member. The housing houses the plurality of disk drive units. The connection member keeps a non-contact state between the plurality of disk drive units and connects the plurality of disk drive units. The damping member is arranged between the housing and the connection member and elastically supports the connection member to the housing in three-axis directions orthogonal to each other.

9 Claims, 12 Drawing Sheets

(56) References Cited

U.S. PATENT DOCUMENTS

| | | |
|---|---|---|
| 9,251,097 B1 | 2/2016 | Kumar et al. |
| 2003/0147220 A1 | 8/2003 | Fairchild |
| 2008/0019091 A1* | 1/2008 | Fan .................. G06F 1/182 361/679.34 |
| 2012/0243170 A1 | 9/2012 | Frink et al. |
| 2014/0281224 A1 | 9/2014 | Frink et al. |
| 2016/0154963 A1 | 6/2016 | Kumar et al. |

FOREIGN PATENT DOCUMENTS

| | | | |
|---|---|---|---|
| CA | 2830068 | A1 | 9/2012 |
| CN | 103930845 | A | 7/2014 |
| EP | 1333441 | A2 | 8/2003 |
| JP | 03-286487 | A | 12/1991 |
| JP | 07-093966 | A | 4/1995 |
| JP | 07-93966 | A | 4/1995 |
| JP | 11-126465 | A | 5/1999 |
| JP | 2003-281877 | A | 10/2003 |
| JP | 2003-308687 | A | 10/2003 |
| JP | 2003-308689 | A | 10/2003 |
| JP | 2003-314613 | A | 11/2003 |
| JP | 2004-128396 | A | 4/2004 |
| JP | 2009-076195 | A | 4/2009 |
| JP | 2009-283064 | A | 12/2009 |
| JP | 5481948 | B2 | 4/2014 |
| JP | 2014-515860 | A | 7/2014 |
| JP | 2015-149117 | A | 8/2015 |
| SG | 193915 | A | 11/2013 |
| WO | 2012/129241 | A2 | 9/2012 |

* cited by examiner

ELECTRONIC DEVICE

CROSS REFERENCE TO RELATED APPLICATIONS

This application is a U.S. National Phase of International Patent Application No. PCT/JP2016/003171 filed on Jul. 4, 2016, which claims priority benefit of Japanese Patent Application No. JP 2015-173568 filed in the Japan Patent Office on Sep. 3, 2015. Each of the above-referenced applications is hereby incorporated herein by reference in its entirety.

TECHNICAL FIELD

The present technology relates to a portable electronic device including a plurality of disk drive units.

BACKGROUND ART

A hard disk drive apparatus (hereinafter also referred to as an HDD (Hard-Disk Drive)) is widely used for an information processing apparatus, e.g., a personal computer, as an electronic device (recording and reproducing apparatus) in which data and programs are written and from which recorded data and the like are read. Not only an HDD built in a main body of the information processing apparatus, but also a portable type or detachable type HDD attachable/detachable to/from the main body of the information processing apparatus is known. The HDD is independently carried or stored apart from the main body of the information processing apparatus.

The portable HDD typically includes a metal housing, and a single HDD unit or a plurality of HDD units housed in the housing. In addition, in order to protect the HDD unit(s) from an external force such as a shock, it is known that block-shaped shock-damping components are attached to four corners of an HDD unit, or the respective plurality of HDD units are fixed to the housing via the shock-damping material, for example (see Patent Literatures 1 to 3).

CITATION LIST

Patent Literature

Patent Literature 1: Japanese Patent Application Laid-open No. 2003-308689
Patent Literature 2: Japanese Patent Application Laid-open No. 2004-128396
Patent Literature 3: Japanese Patent No. 5481948

DISCLOSURE OF INVENTION

Technical Problem

However, in the structure that the shock-damping components are attached to the four corners of the HDD, a mounting space in the housing is increased with the increase of the mounting number of the HDD units. Thus, it is difficult to downsize the device. In addition, in the structure that the shock-damping components are attached to the respective plurality of the HDD units, the respective HDD units are likely to move independently when a shock is applied to the housing, which may result in a collision between the HDD units. In order to avoid this, if a space is provided to prevent the collision, the mounting space in the housing is further increased.

The present technology is made in view of the above-mentioned circumstances, and it is an object of the present technology to provide an electronic device capable of protecting a plurality of HDD units from a shock without increasing a size of the device.

Solution to Problem

An electronic device according to an embodiment of the present technology includes a plurality of disk drive units, a housing, a connection member, and a damping member.

The housing houses the plurality of disk drive units.

The connection member keeps a non-contact state between the plurality of disk drive units and connects the plurality of disk drive units together.

The damping member is arranged between the housing and the connection member and elastically supports the connection member to the housing in three-axis directions orthogonal to each other.

In the electronic device, since the plurality of disk drive units are connected by the connection components together in the non-contact state, the respective disk drive units do not move separately, and the relative positions of the disk drive units can be kept stably. As a result, an extra space between the disk drive units for avoiding collision is unnecessary. In addition, since the respective disk drive units are elastically supported by the damping members arranged between the housing and the connection members in the three-axis directions, attaching shock-damping components to the respective disk drive units is unnecessary. As a result, without increasing the size of the device, it is possible to protect the disk drive units from a shock.

The housing may have a regulator. The regulator is in contact with the damping member and regulates a movement of the connection member toward the housing along the three-axis directions.

With this, relative movements of the disk drive units in the housing are regulated, and the disk drive units can be stably protected from a shock.

The damping member may include a plurality of first elastic components and a plurality of second elastic components.

The plurality of first elastic components are capable of elastically supporting independently the connection member in the two-axis directions of the three-axis directions.

The plurality of second elastic components are capable of elastically supporting the connection member in the other one-axis direction of the three-axis directions.

Alternatively, the damping member may have a plurality of elastic components capable of elastically supporting independently the connection member in all the three-axis directions.

With this, a mounting number of the damping members can be decreased.

In this case, the connection member may have a boss, and the plurality of elastic components may each have an attaching hole that is deeper than the length of the boss and has an inner diameter smaller than an outer diameter of the boss.

With this, the respective elastic components are easily assembled to the respective connection components.

The plurality of disk drive units typically each has a first side surface orthogonal to the first axis direction and a second side surface opposite to the first side surface. In this case, the connection member may have a first connection component that connects the plurality of disk drive units together on the first side surface and a second connection component that connects the plurality of disk drive units together on the second side surface. The damping member is attached to the first connection component and the second connection component.

With this, a mounting number of the damping members can be decreased, and a plurality of disk drive units can be stably elastically supported.

The electronic device may further include an outer cover. The outer cover is mounted to the housing and has hardness higher than hardness of the damping member.

With this, since a shock applied to the housing can be damped, the respective disk drive units can have sufficient anti-shock properties.

The housing typically has a hexahedron structure. In this case, the outer cover may have a plurality of openings that expose a part of each surface of the housing and a plurality of bridge parts that cover edge line parts of the housing.

With this, heat dissipation properties of the housing are ensured, and a shock applied to the housing can be effectively damped.

The electronic device may further include a fan. The fan is arranged inside the housing and is capable of cooling the plurality of disk drive units. In this case, the connection member has an opening that exposes a clearance between the plurality of disk drive units.

With this, heat dissipation properties of the respective disk drive units can be improved.

The electronic device may further include a handle member attached to an outer surface of the housing.

With this, the portability of the electronic device can be improved.

Advantageous Effects of Invention

As described above, according to the present technology, without increasing the size of the device, it is possible to protect the disk drive units from a shock.

It should be noted that the effects described here are not necessarily limitative and may be any of effects described in the present disclosure.

MODE(S) FOR CARRYING OUT THE INVENTION

Hereinafter, embodiments of the present disclosure will be described with reference to the drawings.

First Embodiment

Figure 1:
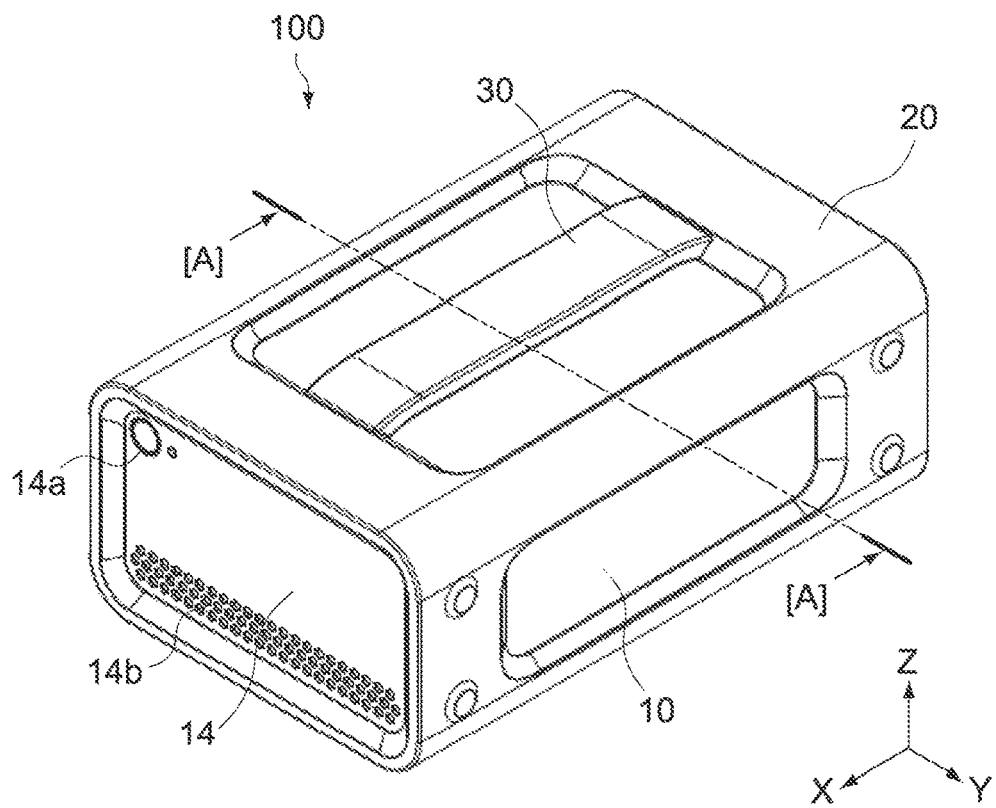
FIG. 1 is a perspective view showing an electronic device according to an embodiment of the present technology.
Figure 2:
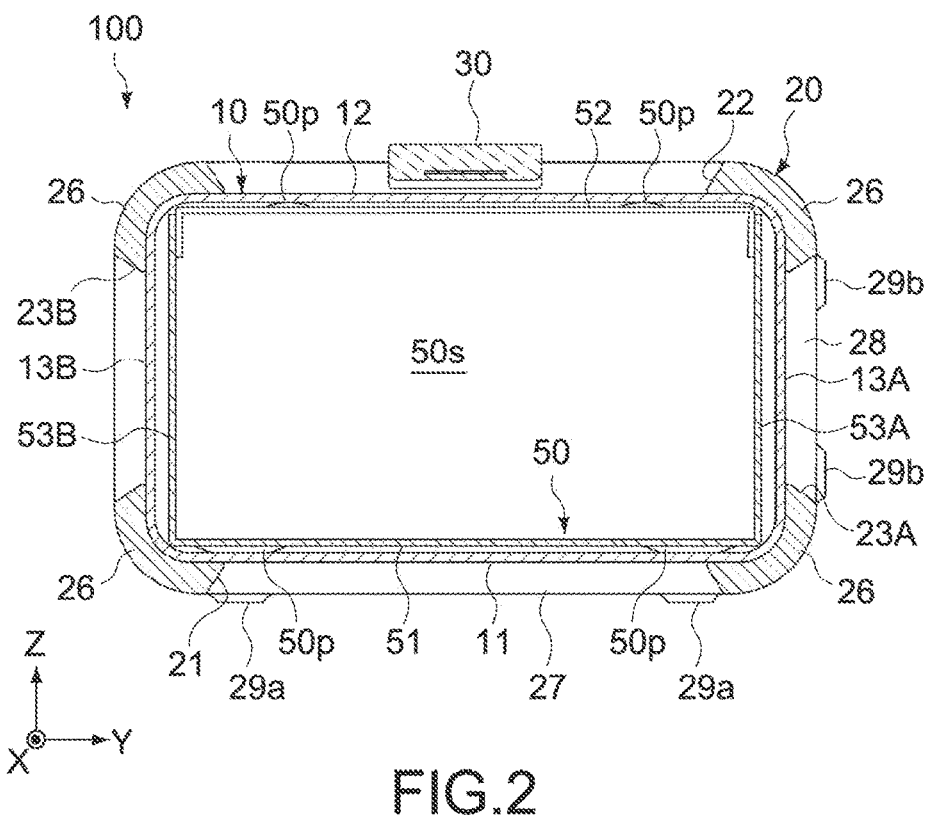
FIG. 2 is a cross-sectional view taken along the line [A]-[A] direction of FIG. 1 with the inner structure being omitted.
Figure 3:
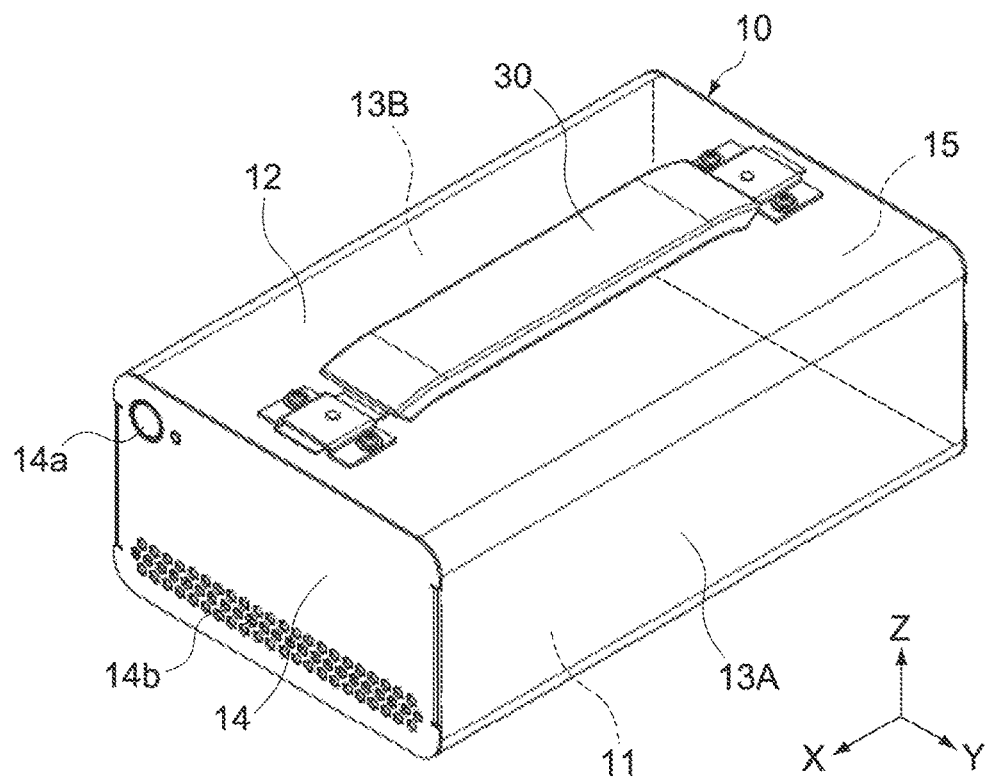
FIG. 3 is a perspective view showing a housing of the electronic device.
Figure 4:
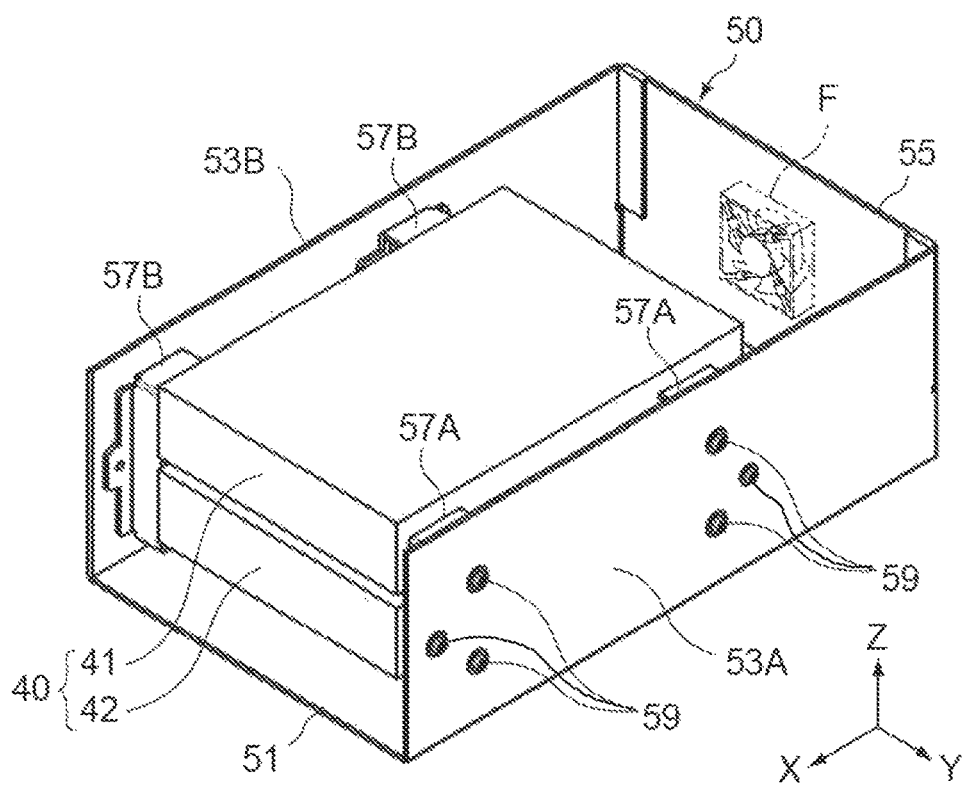
FIG. 4 is a perspective view showing inside of the housing
Figure 5:
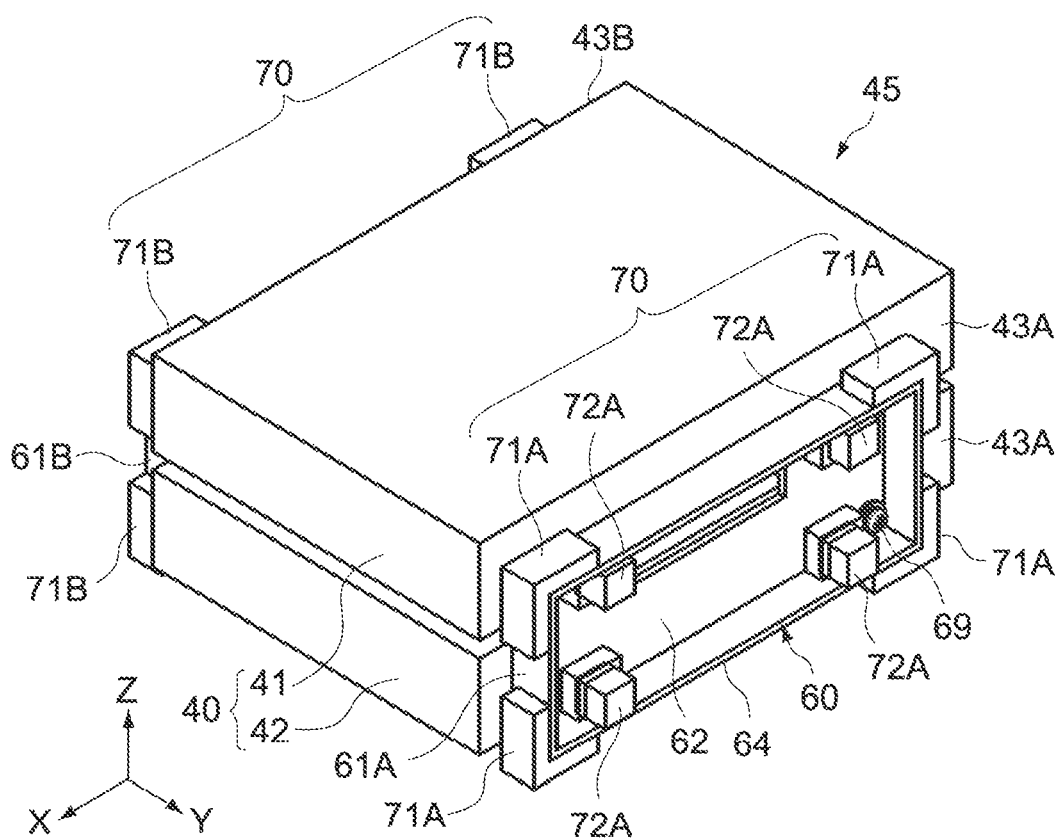
FIG. 5 is a perspective view showing the state that a plurality of disk drive units are connected.
Figure 6:
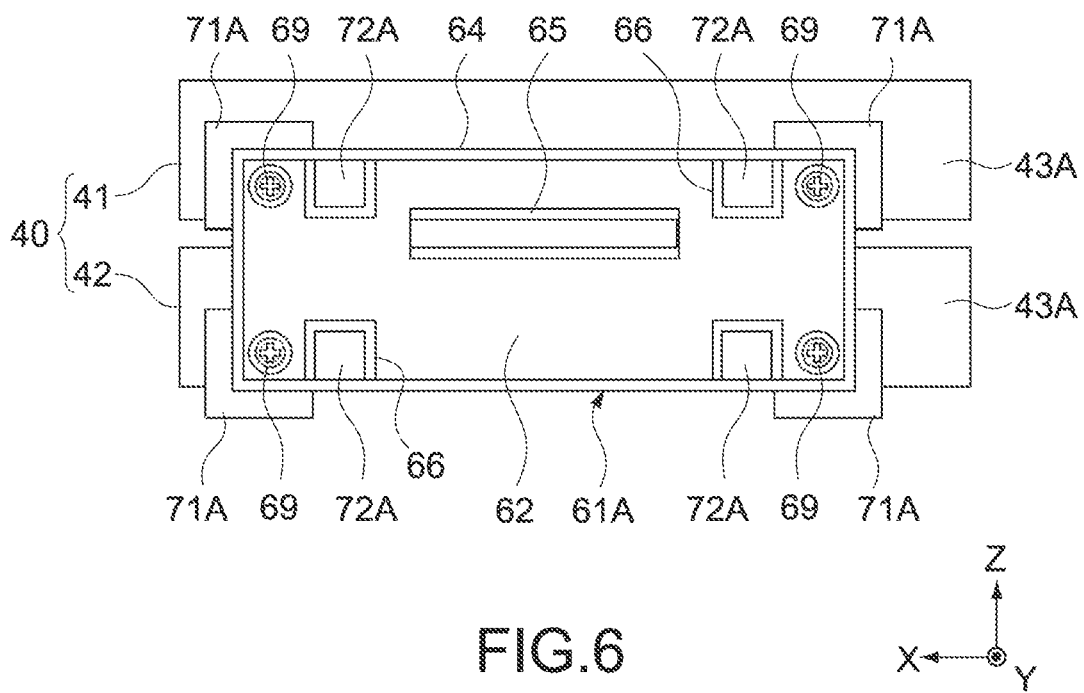
FIG. 6 is a side view of the same.

FIG. 1 is a perspective view showing an electronic device according to an embodiment of the present technology, FIG. 2 is a cross-sectional view taken along the line [A]-[A] direction of FIG. 1 with the inner structure being omitted, FIG. 3 is a perspective view showing a housing, FIG. 4 is a perspective view showing inside of the housing, and FIG. 5 and FIG. 6 are a perspective view and a side view showing the state that a plurality of disk drive units are connected.

Note that the X axis, the Y axis, and the Z axis represent three-axis directions orthogonal to each other in each drawing, here, an arrow direction of the X axis represents a front direction, and the Z axis direction represents a height direction (the same shall apply to the drawings hereinafter).

[Overall Structure of Electronic Device]

An electronic device 100 according to this embodiment is an HDD apparatus for recording and reproducing. The electronic device 100 includes a plurality of hard disk drive units (hereinafter also referred to as HDD units) 40 and a metal housing 10 that houses the units. The electronic device 100 further includes an outer cover 20 and a handle member 30.

(Housing)

As shown in FIG. 3, the housing 10 has a hexahedron structure formed of an approximately parallelepiped shape including a bottom surface 11, a top surface 12, a left side surface 13A, a right side surface 13B, a front surface 14, and a back surface 15. On the top surface 12, a handle member 30 is attached.

On the front surface 14, a power button 14a and vents 14b are arranged. On the back surface 15, there are a variety of terminals, vents, and the like connected to an external device such as an information processing apparatus (not shown). Inside the back surface 15, a support plate 55 supporting a fan F is arranged (see FIG. 4). In addition, on a backward side of the bottom surface 11, a circuit board including the above-described variety of terminals, connectors (not shown) that are electrically connected to the HDD units 40, and the like is arranged.

As shown in FIG. 2, the electronic device 100 has a metal inner chassis 50 supporting the plurality of HDD units 40, and the housing 10 houses the inner chassis 50 and the plurality of HDD units 50. The inner chassis 50 is assembled into the housing 10 via a plurality of screws (not shown) and functions as a part of the housing 10 after assembling.

The inner chassis 50 has a bottom surface 51, a top surface 52, a left side surface 53A, and a right side surface 53B (see FIG. 4). The respective surfaces form a space 50s that houses the plurality of HDD units 40 (see FIG. 2). Among them, the bottom surface 51 and the left and right side surfaces 53A and 53B are integrally formed, but the top surface 52 is formed of a different member (see FIG. 2). The inner chassis 50 is typically formed of a metal material, but is not limited thereto, and may be formed of a synthetic resin material. The plurality of HDD units 40 are supported by the left and right side surfaces 53A and 53B via a plurality of supporting members 57A and 57B, as described later (see FIG. 4, FIG. 8, and FIG. 10).

To rear side ends of the left and right side surfaces 53A and 53B, the support plate 55 supporting the fan F is attached. The fan F is for taking outside air into inside the housing 10 via the vents 14b of the front surface 14 and cooling the plurality of HDD units 40 by using the taken outside air. The taken outside air is discharged outside via the vents of the back surface 15.

The top surface 52 of the inner chassis 50 is attachably/detachably formed on upper ends of the left and right side surfaces 53A and 53B. On the bottom surface 51 and the top surface 52 of the inner chassis 50, a plurality of protrusions 50p are arranged to be in contact with respective inner surfaces of the bottom surface 11 and the top surface 12 of the housing 10. The plurality of protrusions 50p have a function of defining contact points between the housing 10 and the inner chassis 50. Thus, the housing 10 can have a double structure.

(HDD Unit)

The plurality of HDD units 40 include a first HDD unit 41 and a second HDD unit 42 as shown in FIG. 4.

The first and second HDD units 41 and 42 each includes a hard disk, a drive mechanism including a magnetic head for writing information such as data and a program into the hard disk and for reading out the information from the hard disk, a case having a substantially rectangular shape, seen from the top, that houses the hard disk and the drive mechanism, and the like.

As shown in FIG. 5, the first and second HDD units 41 and 42 typically have the same structure each other and are faced each other such that each main surface (top surface or bottom surface) is perpendicular to the Z axis direction. The first and second HDD units 41 and 42 include two side surfaces 43A and 43B (first side surface and second side surface) faced each other in the Y axis direction, and connection members 60 (61A and 61B) that keep the facing relationship are attached to the respective side surfaces 43A and 43B, as described later.

(Support Structure of HDD Unit)

Next, a support structure of the plurality of HDD units 40 for the inner chassis 50 will be described.

Figure 7:
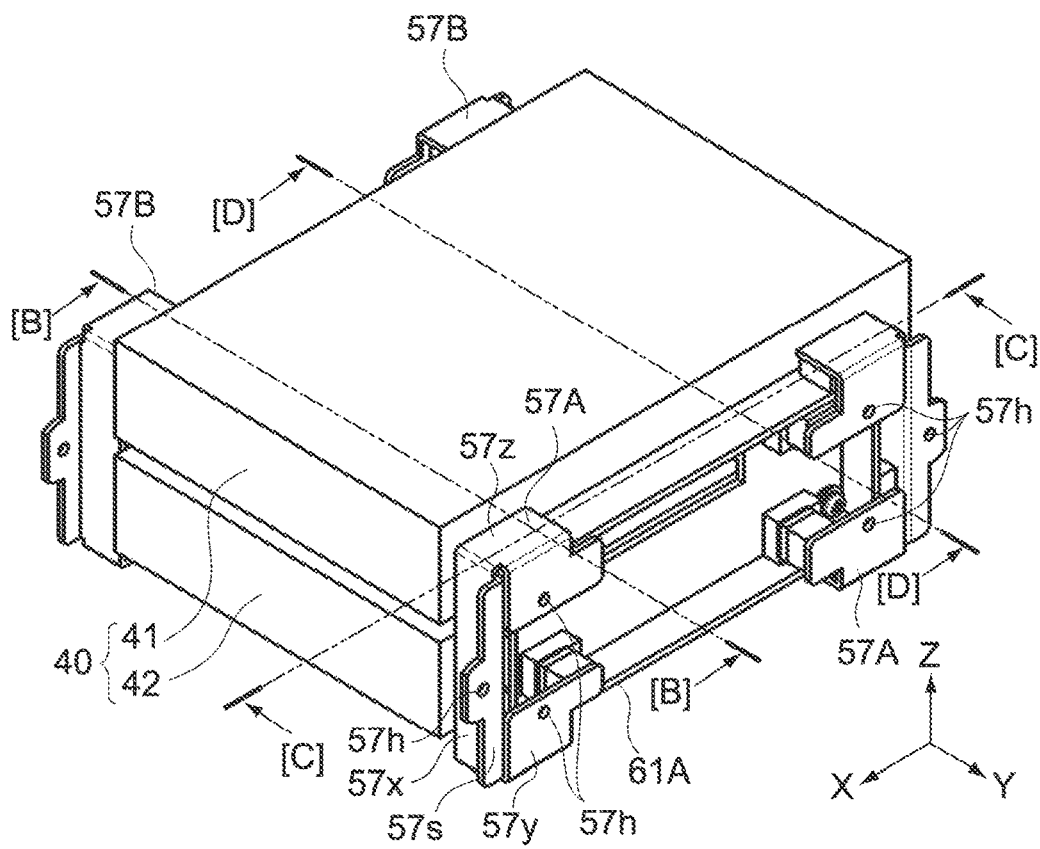
FIG. 7 is a perspective view showing the state that a plurality of supporting members are attached to the plurality of HDD units.
Figure 8:
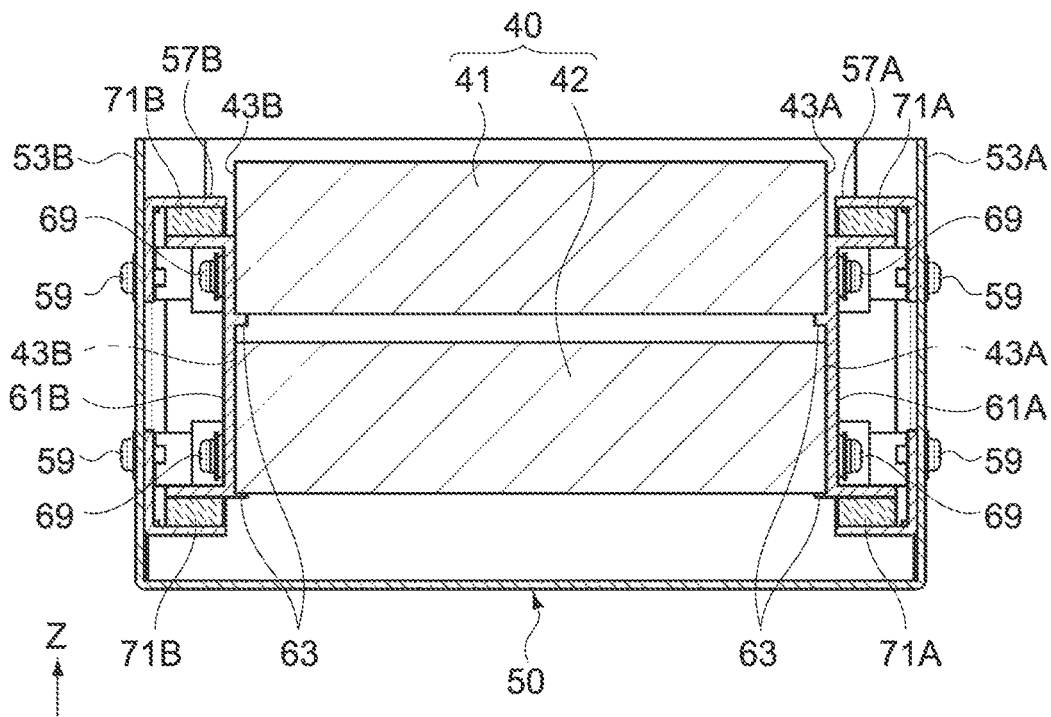
FIG. 8 is a cross-sectional view taken along the line [B]-[B] direction of FIG. 7.
Figure 9:
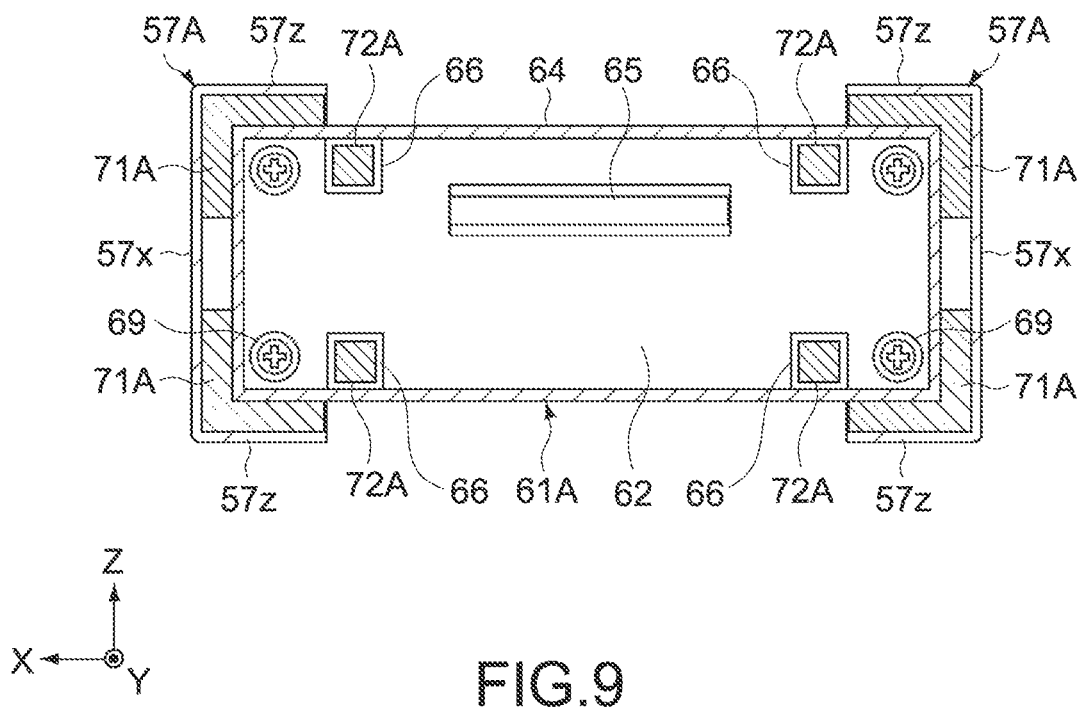
FIG. 9 is a cross-sectional view taken along the line [C]-[C] direction of FIG. 7.
Figure 10:
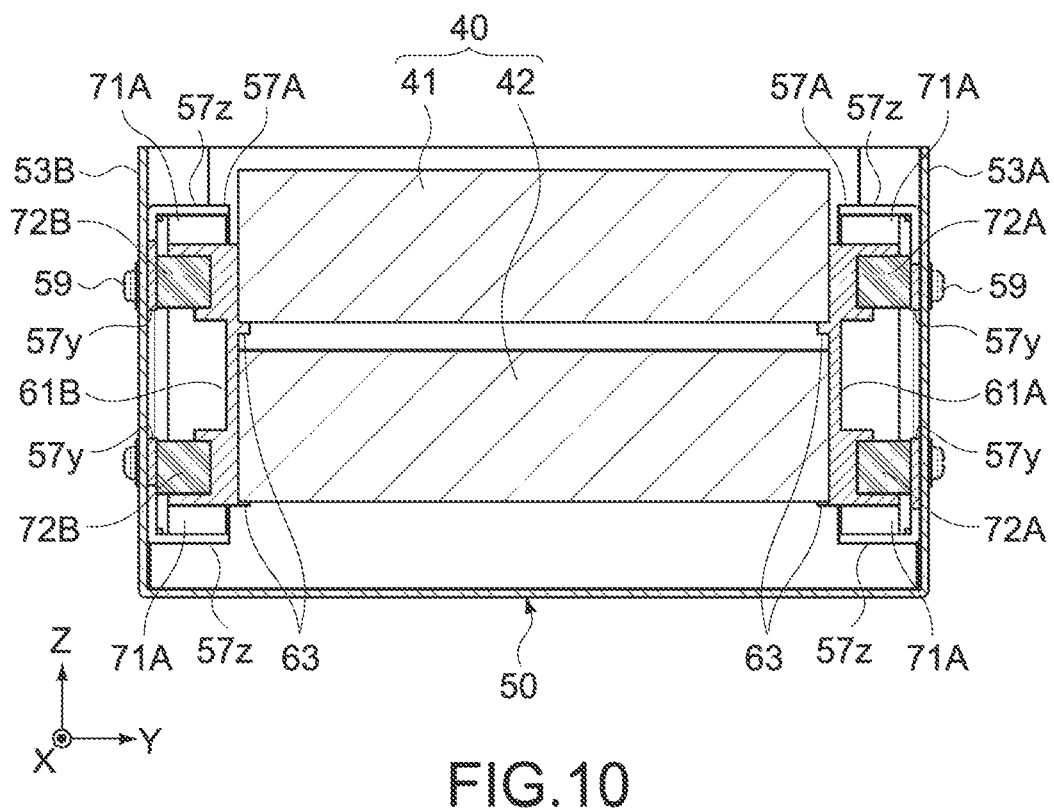
FIG. 10 is a cross-sectional view taken along the line [D]-[D] direction of FIG. 7.

FIG. 7 is a perspective view showing the state that the plurality of supporting members 57A and 57B are attached to the plurality of HDD units 40, FIG. 8 is a cross-sectional view taken along the line [B]-[B] direction of FIG. 7, FIG. 9 is a cross-sectional view taken along the line [C]-[C] direction of FIG. 7, and FIG. 10 is a cross-sectional view taken along the line [D]-[D] direction of FIG. 7. Note that FIG. 8 and FIG. 10 show the state that the HDD units 40 are assembled into the inner chassis 50.

The electronic device 100 includes the connection members 60 that connect the plurality of HDD units 40 together, and damping members 70 that elastically support the connection members 60 to the inner chassis 50 in the three-axis directions (X axis, Y axis, and Z axis directions).

The connection members 60 keep a non-contact state between the first HDD unit 41 and the second HDD unit 42 and connect the HDD units 41 and 42 together. In this embodiment, the connection members 60 include a first connection component 61A and a second connection component 61B. The connection members 60 are typically formed of a synthetic resin material and may be formed of a metal material.

The first connection component 61A connects the first and second HDD units 41 and 42 together at one side surfaces 43A of the units. On the other hand, the second connection component 61B connects the first and second HDD units 41 and 42 together at the opposite side surfaces 43B of the units. The first and second connection components 61A and 61B have the same structure each other.

The first and second connection components 61A and 61B each includes a plate 62 having a substantially rectangular shape, a pair of elongated protrusions 63 formed on the plate 62 at the inner side, a flange 64 formed along a periphery of the plate 62, an opening 65 formed through the plate 62, and a plurality of bosses 66 formed on the plate 62.

Each plate 62 is formed in a rectangular shape having long sides in the X axis direction and short sides in the Z axis direction and is fixed to each of the side surfaces 43A and 43B of the plurality of HDD units 40 across each of the side surfaces 43A and 43B. To fix each plate 62 and each of the HDD units 41 and 42, a plurality of screws 69 are used and inserted into four corners of each plate 42.

The pair of elongated protrusions 63 are formed in parallel in the X axis direction and protrude from an inner surface of each plate 62 to lower edge of each of the side surfaces (43A and 43B) of each of the HDD units 41 and 42. The pair of elongated protrusions 63 are for positioning the HDD units 41 and 42 and keeping a non-contact state between the HDD units 41 and 42 and are arranged each other at a distance in the Z axis direction such that a predetermined clearance is formed between the HDD units 41 and 42.

Flanges 64 are for supporting first elastic components 71A and 71B as described later and are formed in a substantially rectangular annular shape. The flanges 64 protrude from the peripherals of the plates 62 to outside (side surfaces 53A and 53B sides of inner chassis 50), and the first elastic components 71A and 71B are attached to outer peripheral surfaces at respective corners of the flanges 64.

Each opening 65 is for exposing a clearance between the plurality of HDD units 40 and is arranged at the position facing to the clearance in the Y axis direction. Typically, the opening 65 is formed between the pair of elongated protrusions 63. In this embodiment, as shown in FIG. 6, the opening 65 is arranged at a position slightly upward from the center of the plate 62 and has an elongated rectangular shape having long sides in the Y axis direction. But it is not limited thereto, the opening 65 may include a plurality of holes arranged along the clearance between the plurality of HDD units 40 in the X axis direction.

By forming the openings 65 in the respective connection components 61A and 61B and operating the fan F, the outside air taken inside the housing 10 smoothly flows. It is thus possible to increase a cooling efficiency of the respective HDD units 41 and 42. In addition, the outside air passes through between the connection component 61A and the side surface 53A of the inner chassis 50 and between the connection component 61B and the side surface 53B of the inner chassis 50, and it is thus possible to suppress degradation or the like of the damping members 70 due to heat as described later.

The plurality of bosses 66 are for supporting second elastic components 72A and 72B as described later and are formed in a square tube shape protruding from outer surfaces of the plates 62 to outward (side surfaces 53A and 53B sides of the inner chassis 50). A protrusion amount of each boss 66 is set to smaller than a protrusion amount of the flange 64. A total of four bosses 66 are formed at four corners of the outer surface of the plate 62.

The electronic device 100 according to this embodiment includes the damping members 70 arranged between the housing 10 (inner chassis 50) and the connection members 60. The damping members 70 elastically support the connection members 60 to the housing 10 in the three-axis (the X axis, the Y axis, and the Z axis) directions orthogonal to each other.

In this embodiment, the damping members 70 include the first elastic components 71A and 71B and the second elastic components 72A and 72B.

In this embodiment, the first elastic components 71A and 71B can elastically support independently the connection members 60 (connection components 61A and 61B) in the two-axis directions of the three-axis directions, as described later. On the other hand, the second elastic components 72A and 72B can elastically support the connection members 60 (connection components 61A and 61B) in the other one-axis direction of the three-axis directions, as described later.

The first elastic components 71A are attached at four corners of the outer peripheral surface of the flange 64 of the connection component 61A. On the other hand, the first elastic components 71B are attached at four corners of the outer peripheral surface of the flange 64 of the connection component 61B. The first elastic components 71A and 71B are for elastically supporting the connection components 61A and 61B to the housing 10 (inner chassis 50) in the two-axis directions, i.e., the X axis and the Z axis.

The first elastic components 71A and 71B are formed of substantially L-shaped elastic components and have two linear parts in parallel with the X axis direction and the Z axis direction, as shown in FIG. 5. Width dimensions of the two linear parts of the first elastic components 71A and 71B in parallel with the Y axis direction are same as or may be larger or smaller than width dimensions of the flanges 64.

The second elastic components 72A are attached to the plurality of bosses 66 of the connection component 61A. Similarly, the second elastic components 72B are attached to the plurality of bosses 66 of the connection component 61B. The second elastic components 72A and 72B are for elastically supporting the connection components 61A and 61B to the housing 10 (inner chassis 50) in the Y axis direction.

The second elastic components 72A and 72B are formed of square pillar-shaped elastic components having long axes in the Y axis direction, as shown in FIG. 5. One ends of the second elastic components 72A and 72B are mounted to the bosses 66 and the other ends thereof are positioned outside heads (protruded ends) of the flanges 64.

The first elastic components 71A and 71B and the second elastic components 72A and 72B are formed of any non-limiting elastic materials having shock-absorbing properties and, in this embodiment, are formed of a rubber material having rubber hardness of 30 degrees or less. As the elastic material, "SORBO" (registered trademark) manufactured by Sanshin Enterprises Co., Ltd. is applicable, for example.

Note that the shape of the elastic components is not limited to the L shape and the square pillar shape. For example, the first elastic components 71A and 72A may be formed by combining two square pillar-shaped elastic components or may include hollows inside in order to enhance elastic deformation properties. The two first elastic components facing to the Z axis direction may be formed of one common elastic component. The second elastic components 72A and 72B may be formed of square tube-shaped elastic components having hollows or may be formed of elastic components having a shape other than the square tube (columnar or cylindrical).

As shown in FIG. 5, the plurality of HDD units 40, the respective connection components 61A and 61B, and the respective elastic components 71A, 71B, 72A, and 72B are combined together to form one unit structure 45. The unit structure 45 is assembled into the space 50s of the inner chassis 50 via the supporting members 57A and 57B.

The supporting members 57A and 57B are attached to the flanges 64 so as to cover the first and second elastic components 71A, 71B, 72A, and 72B, as shown in FIG. 7. In other words, the supporting members 57A are attached to a pair of short side areas of the flange 64 of the connection component 61A, and the supporting members 57B are attached to a pair of short side areas of the flange 64 of the connection component 61B. The material forming the supporting members 57A and 57B is not especially limited and may be a metal material or a synthetic resin material.

The supporting members 57A and 57B each has a surface 57x that is in contact with the first elastic components 71A and 71B facing to the X axis direction and has a surface 57z that is in contact with the first elastic components 71A and 71B facing to the Z axis direction (see FIG. 9). The surface 57x is formed in common for the two elastic components arranged in the Z axis direction and the surface 57z is individually formed corresponding to each elastic component.

In addition, the supporting members 57A and 57B each has a surface 57y that is in contact with the second elastic components 72A and 72B facing to the Y axis direction (see FIG. 10). The surface 57y is individually formed corresponding to each elastic component.

The surfaces 57x and the surfaces 57y of the supporting members 57A and 57B are connected together via the surfaces 57z. The surfaces 57y have screw holes 57h that are engaged with screws 59 that are inserted into the side surfaces 53A and 53B of the inner chassis 50. Furthermore, as shown in FIG. 7, the surfaces 57x have auxiliary surfaces 57s positioned coplanar with the surfaces 57y. Also, the surfaces 57s have the screw holes 57h that are engaged with the screws 59.

The plurality of HDD units 40 are integrated via the connection components 61A and 61B and are housed in the space 50s of the inner chassis 50 in the state that the first and second elastic components 71A, 71B, 72A, and 72B and the supporting members 57A and 57B are mounted to the connection components 61A and 61B. After that, the supporting members 57A and 57B are fixed to both the side surfaces 53A and 53B of the inner chassis 50 via the plurality of screws 59 (see FIG. 4, FIG. 8, and FIG. 10). As a result, the connection components 61A and 61B and the plurality of HDD units 40 will be elastically supported by the housing 10 (inner chassis 50) via the first and second elastic components 71A, 71B, 72A, and 72B.

At this time, the respective surfaces 57x, 57y, and 57z of the supporting members 57A and 57B are fixed to the connection components 61A and 61B via the first and second elastic components 71A, 71B, 72A, and 72B. Accordingly, the supporting members 57A and 57B also function as regulators that regulate movements of the connection members 61A and 61B toward the housing 10 (inner chassis 50) along the three-axis (X axis, Y axis, and Z axis) directions. As a result, relative movements of the HDD units 41 and 42 in the housing 10 are regulated to suppress misalignment and the HDD units 41 and 42 can be stably protected from a shock.

In addition, the supporting members 57A and 57B are assembled into the inner chassis 50 in the state that the surfaces of the respective elastic components 71A, 71B, 72A, and 72B are coated in advance so that the surfaces of the respective elastic components 71A, 71B, 72A, and 72B are inhibited from coming in contact with the side surfaces 53A and 53B of the inner chassis 50. As a result, even if the elastic components have high tackiness (stickiness) or high surface friction coefficient, the plurality of HDD units 40 can be smoothly mounted into the space 50s of the inner chassis 50 (see FIG. 2). Thus, operability can be improved.

(Outer Cover)

Next, the outer cover 20 will be described.

As shown in FIG. 1 and FIG. 2, the outer cover 20 is mounted on the outer surface of the housing 10 and has functions of protecting the housing 10 from an external shock and temporarily damping the external shock applied to the plurality of HDD units 40 in the housing 10.

The outer cover 20 is typically formed of an elastic material such as synthetic rubber. A silicone rubber material is used, for example. The hardness of the outer cover 20 is greater than the hardness of the rubber material for the first and second elastic components 71A, 71B, 72A, and 72B of the damping member 70 and the rubber hardness of the outer cover 20 is 50 degrees or more, for example. Thus, by making the rubber hardness of the outer cover 20 higher than the rubber hardness of the damping member 70 (for example, 30 degrees or less), it is possible to effectively damp the shock transmitted to the plurality of HDD units 40.

Figure 11:
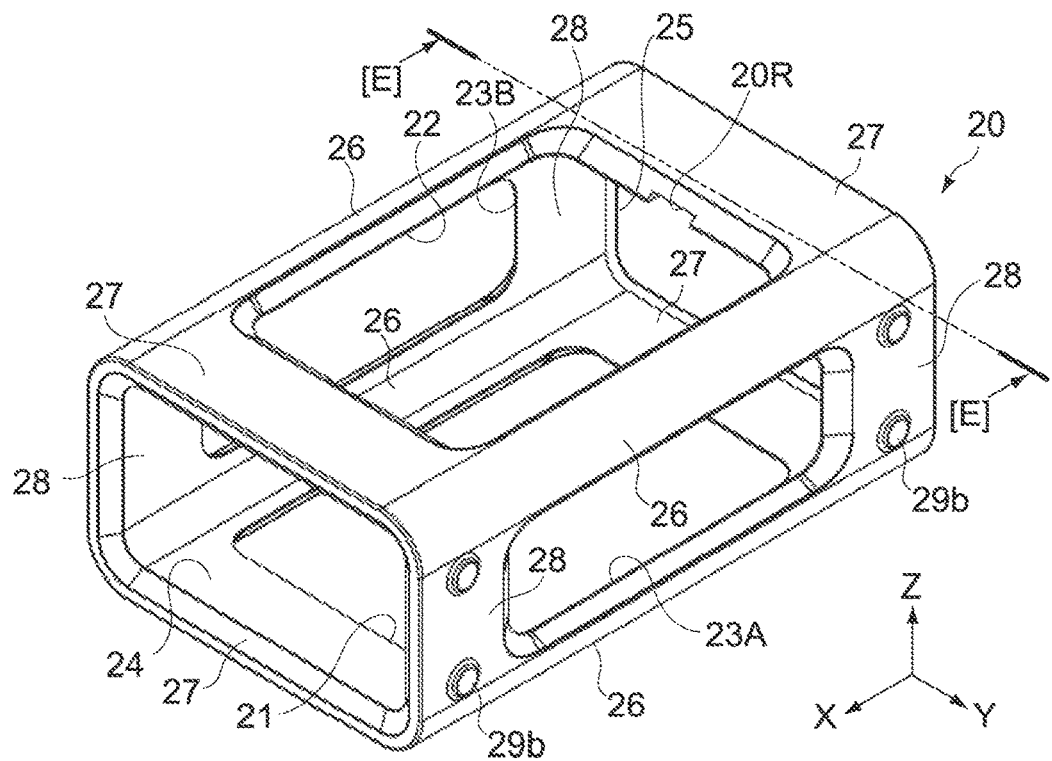
FIG. 11 is a perspective view showing the whole outer cover.

FIG. 11 is a perspective view showing the whole outer cover 20.

The outer cover 20 includes a plurality of openings 21, 22, 23A, 23B, 24, and 25 that expose parts of the respective surfaces 11, 12, 13A, 13B, 14, and 15 of the housing 10 and a plurality of bridge parts 26, 27, and 28 that cover edge line parts of the housing 10.

Each of the openings 21, 22, 23A, 23B, 24, and 25 is formed in a rectangular shape having rounded four corners. As a result, relatively wide areas of approximately center parts of the respective surfaces 11, 12, 13A, 13B, 14, and 15 of the housing 10 are exposed. Thus, heat dissipation properties of the housing 10 are improved. Note that the openings 21, 22, 23A, 23B, 24, and 25 are substantially defined by the shapes of the respective bridge parts 26, 27, and 28.

The bridge parts 26, 27, and 28 cover respective edge line parts in parallel with the X axis direction, the Y axis direction, and the Z axis direction of the housing 10. In particular, the bridge parts 26 are formed over parts of the bottom surface 11, the top surface 12, and left and right side surfaces 13A and 13B of the housing 10. The bridge parts 27 and the bridge parts 28 are formed avoiding the front surface 14 and the back surface 15 of the housing 10.

Since the bridge parts 26 to 28 are formed to cover the respective edge line parts of the housing 10, there is less chance to directly act an external force on the housing 10, even in a case where the electronic device 100 is accidentally dropped or touched with external devices or constructions while a user is carrying the electronic device 100. As a result, the outer cover 20 can highly efficiently protect the housing 10. In addition, the outer cover 20 can prevent foreign matters and moisture from entering the housing 10 and can improve design of the electronic device 100.

As shown in FIG. 2, the two bridge parts 27 that cover a front surface side and a back surface side of the bottom 11 of the housing 10 have a plurality of protrusions 29a that function as legs when the electronic device 100 is placed with the bottom surface 11 facing down. Also, the bridge parts 28 that cover a front surface side and a back surface side of the left side surface 13A of the housing 10 have a plurality of protrusions 29b that function as legs when the electronic device 100 is placed with the left side surface 13A facing down.

Figure 12:
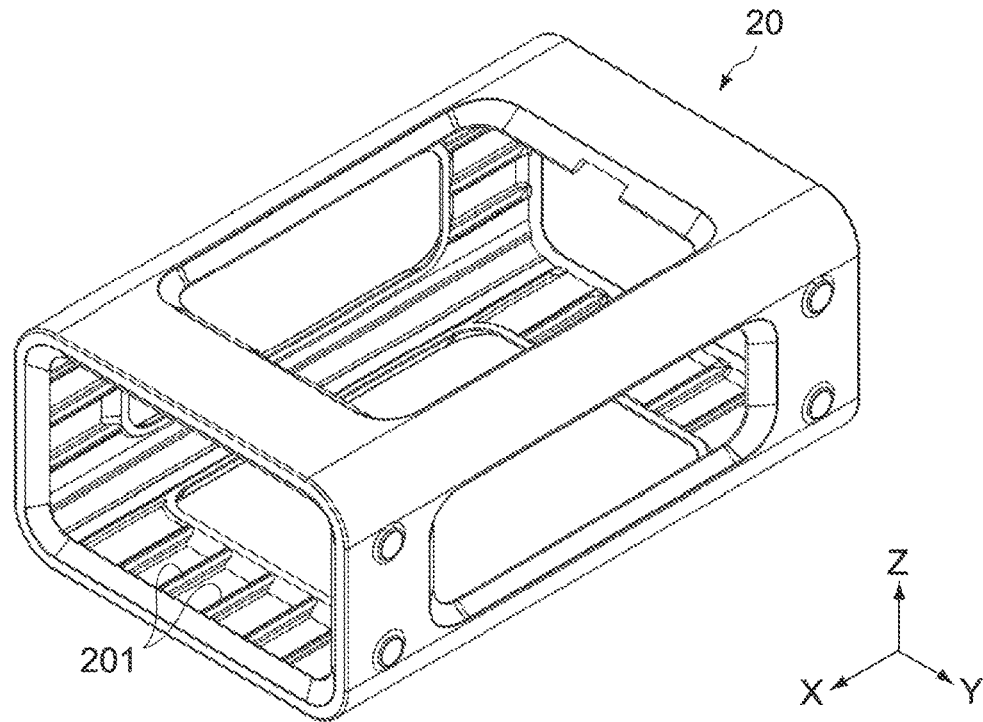
FIG. 12 is a perspective view showing an alternative embodiment of an outer cover structure.

The outer cover 20 is mounted to the housing 10 in the X axis direction. The mount direction may be from a front surface 14 side or a back surface 15 side of the housing 10. Note that, in order to improve mountability of the outer cover 20, for example, as shown in FIG. 12, an inner surface of the outer cover 20 may have a plurality of ribs 201 in a mounting direction (X axis direction). According to this structure, the slidability is increased and the mountability is improved. In addition, there is provided a lightening effect of the outer cover 20, which can decrease the weight of the outer cover 20 or improve elasticity of the outer cover 20.

(Handle Member)

Figure 13:
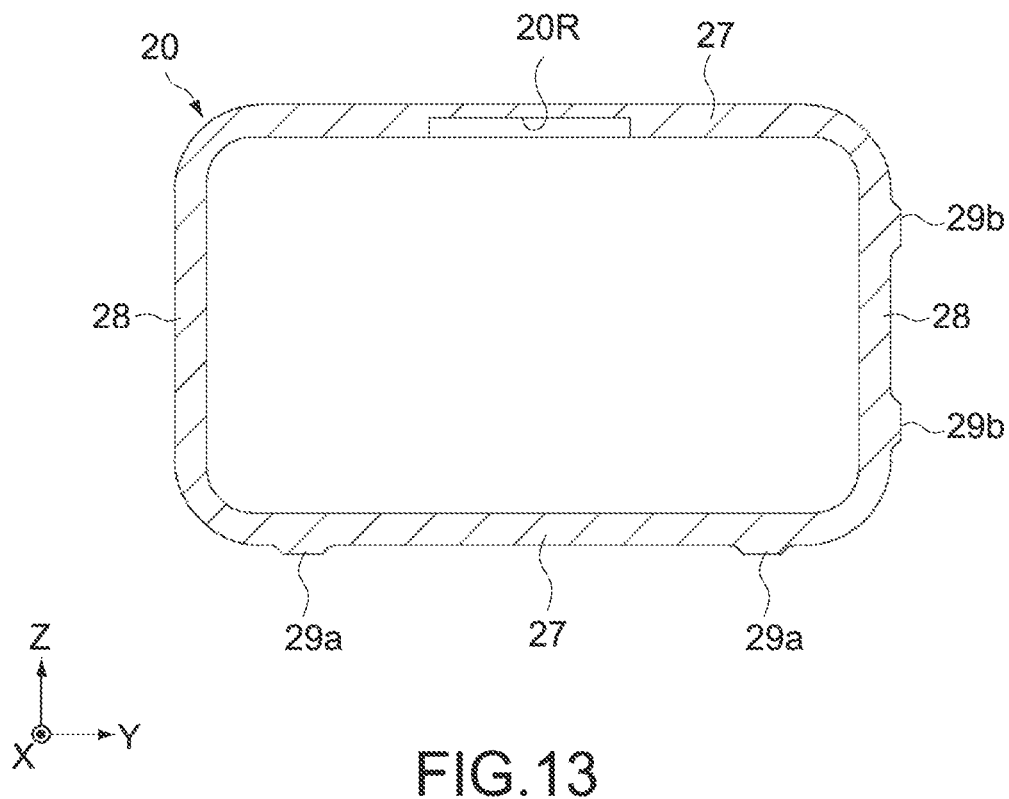
FIG. 13 is a cross-sectional view taken along the line [E]-[E] direction of FIG. 11.
Figure 14:
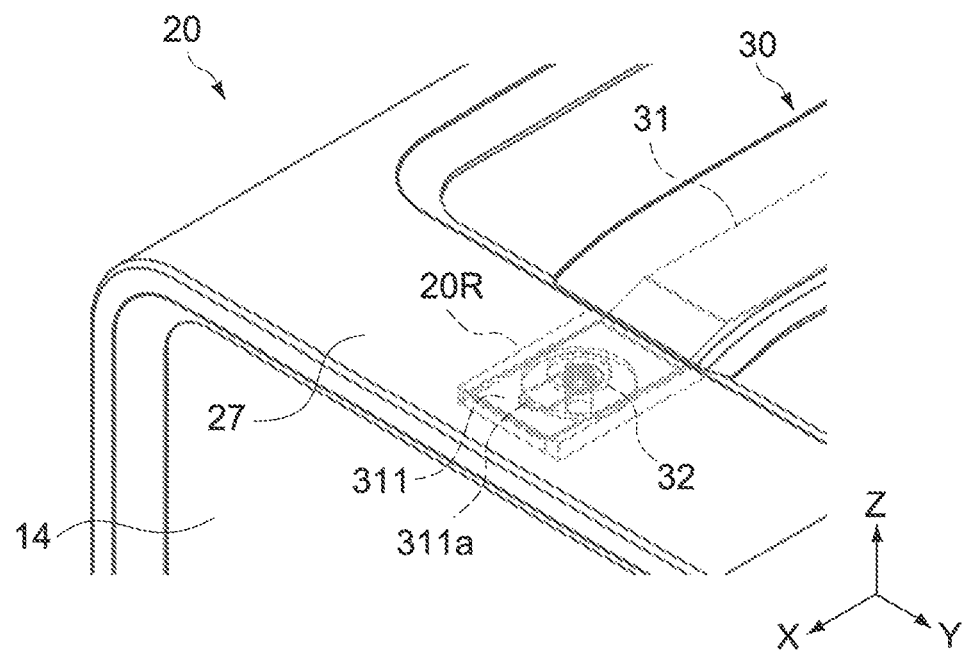
FIG. 14 is a perspective view showing a main part of showing an attaching portion of a handle member.

A handle member 30 is for improving portability of the electronic device 100 and is arranged on the top surface 12 of the housing 10. FIG. 13 is a cross-sectional view taken along the line [E]-[E] direction of FIG. 11, FIG. 14 is a perspective view showing a main part of showing an attaching portion of the handle member 30, and FIG. 15 is a cross-sectional side view showing the handle member 30.

The handle member 30 includes a handle 31 and fixing screws 32 that fix the handle 31 to the top surface 12 of the housing 10.

Figure 15:
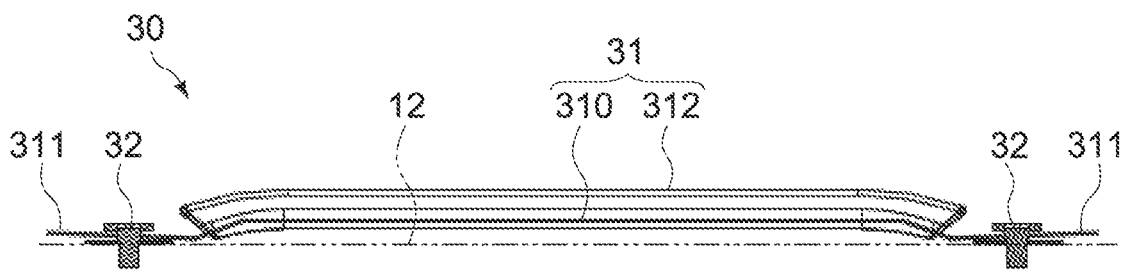
FIG. 15 is a cross-sectional side view showing the handle member

As shown in FIG. 15, the handle 31 includes a base 310 and a grip 312 covering the base 310. The base 310 includes a flat spring having a longitudinal direction in the X axis direction, a width direction in the Y axis direction, and a thickness direction in the Z axis direction. Both ends 311 of the base 310 are attached to the top surface 12 with the fixing portions 32 such that they can move relatively in the X axis direction. As a result, the base 311 is elastically deformable and curved to protrude in the Z axis direction.

The grip 312 is an area excluding both ends 311 of the base 310 and is arranged so as to be exposed from the opening 22 of the upper surface of the outer cover 20 to outward. The grip 312 is typically formed of a deformable material such as a rubber material, a fiber material, and elastomer.

The fixing screws 32 are for fixing both the ends 311 of the base 310 to the top surface 12 of the housing 10. The fixing screws 32 are housed in concave portions 20R (see FIG. 13) formed at inner surfaces (rear surfaces) of the bridge parts 27 and are covered by the bridge parts 27 when the outer cover 20 is mounted (see FIG. 14).

The fixing screws 32 are screwed to the top surface 12 through the ends 311 of the base 310. Each end 311 of the base 310 has a long hole 311a having a long axis in parallel with the X axis direction (see FIG. 14), and each fixing screw 32 penetrates through the long hole 311a and is attached to the top surface 12 in the state that the end 311 is slidable in a predetermined amount in the X axis direction.

In this embodiment, since the electronic device 100 has the handle member 30, the electronic device 100 can be easily picked up as compared with the case that the outer cover 20 is directly held with hands and transported. In addition, since the handle 31 is elastically deformable, gripping properties of the handle 31 can be improved when a user carries the electronic device. Furthermore, when the electronic device 100 is placed, the shape of the handle 31 is recovered by an elastic force and keeps a natural state. Thus, the protrusion amount from the top surface 12 can be reduced.

(Shock-Damping Properties to HDD Unit)

In the electronic device 100 according to this embodiment configured as described above, the respective HDD units 41 and 42 are elastically supported by the damping members 70 (elastic components 71A, 71B, 72A, and 72B) arranged between the housing 10 (inner chassis 50) and the connection members 60 (connection components 61A and 61B) in the three-axis directions. Specifically, according to this embodiment, the shock applied to the respective HDD units 41 and 42 can be damped not individually but altogether. Accordingly, attaching shock-damping components to the respective HDD units is unnecessary. As a result, without increasing the size of the device, the respective HDD units 41 and 42 can be protected from the shock.

In particular, according to this embodiment, the plurality of HDD units 40 are connected together by the connection components 61A and 61B in the non-contact state. In the case where the shock or the like is applied, the respective HDD units 41 and 42 do not move separately. Thus, the relative positions of the HDD units 41 and 42 can be kept stably. As a result, an extra space between the HDD units 41 and 42 for avoiding collision is unnecessary, and it is therefore possible to avoid increasing the size of the device.

In addition, according to this embodiment, since the outer cover 20 is mounted to the housing 10, the outer cover 20 can damp a temporal shock when the shock is applied. As a result, the shock transmitted to the inside of the housing 10 is attenuated, and a shock-absorbing effect by the damping member 70 can be further improved.

Second Embodiment

Next, another embodiment of the present technology will be described with reference to FIG. 16 to FIG. 22.

Hereinafter, structures different from the first embodiment will be mainly described, the structures similar to those of the first embodiment are denoted by the similar reference numerals, and the detailed description thereof will be omitted or simplified.

Figure 16:
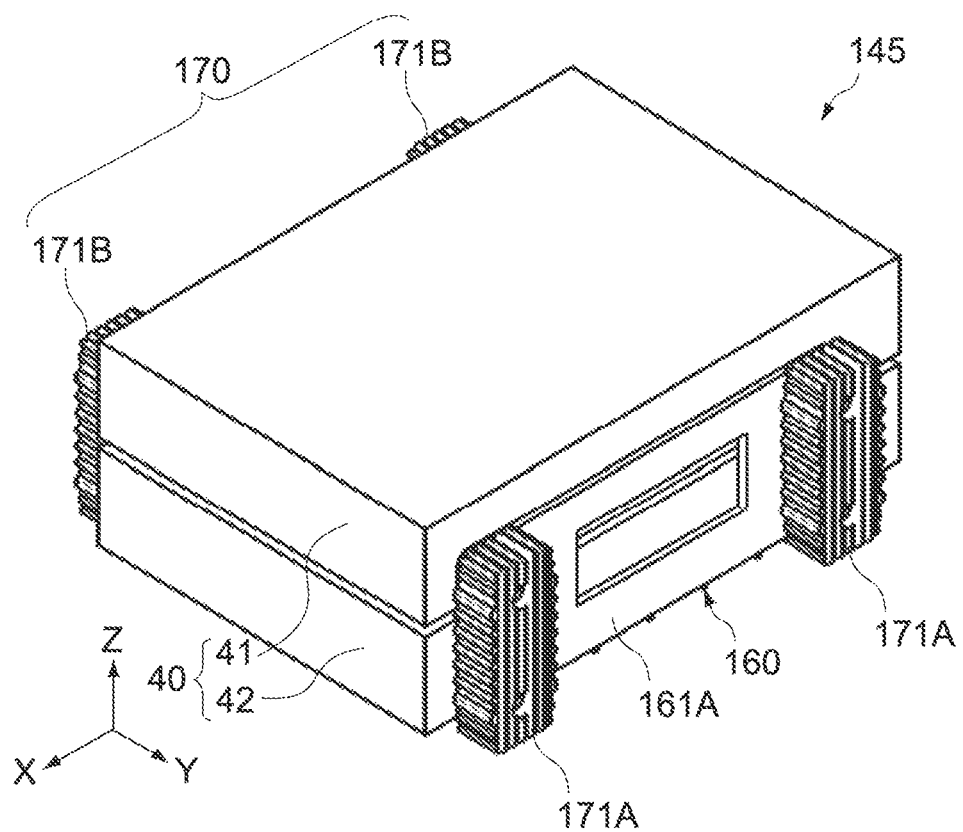
FIG. 16 is a perspective view showing an entire unit structure according to other embodiment of the present technology.
Figure 17:
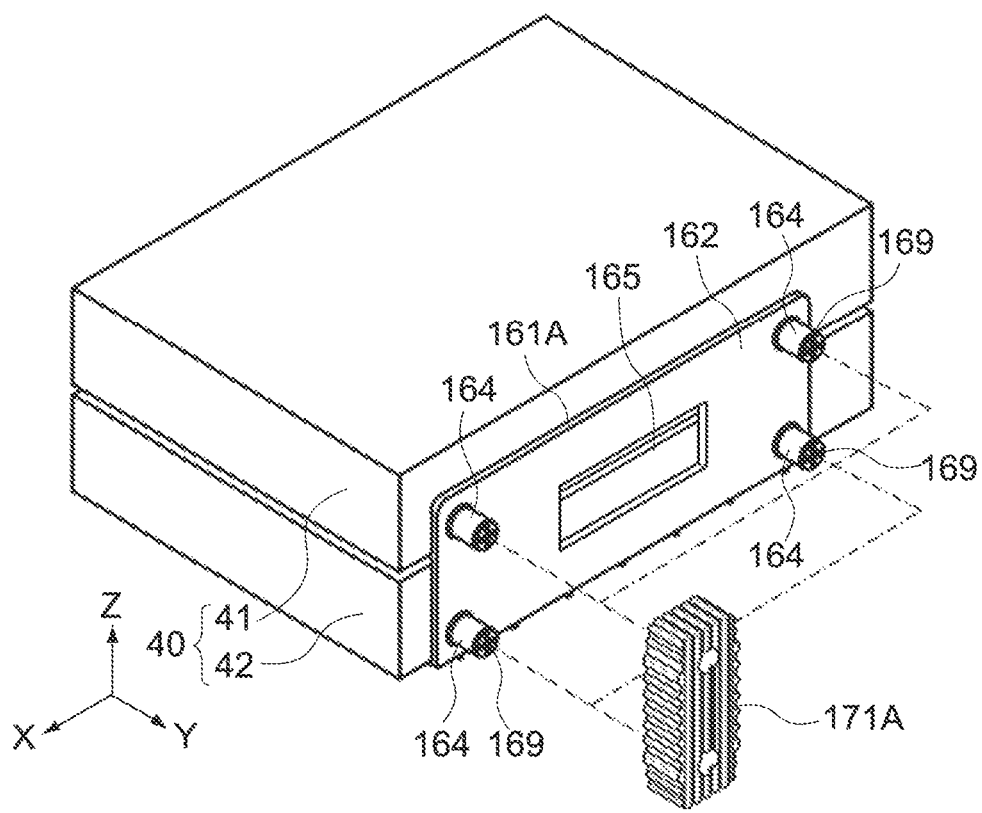
FIG. 17 is a perspective view showing an attachment structure of damping members of the unit structure
Figure 18:
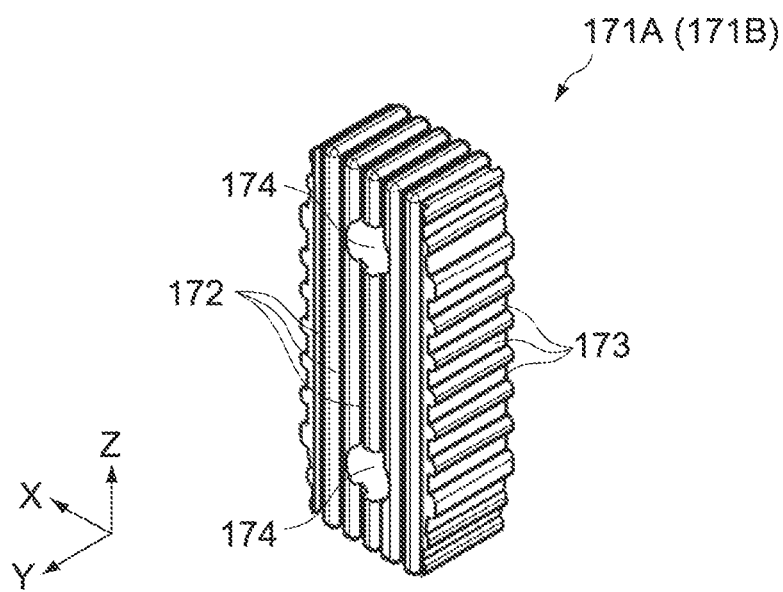
FIG. 18 is a perspective view showing the entire damping member.
Figure 19:
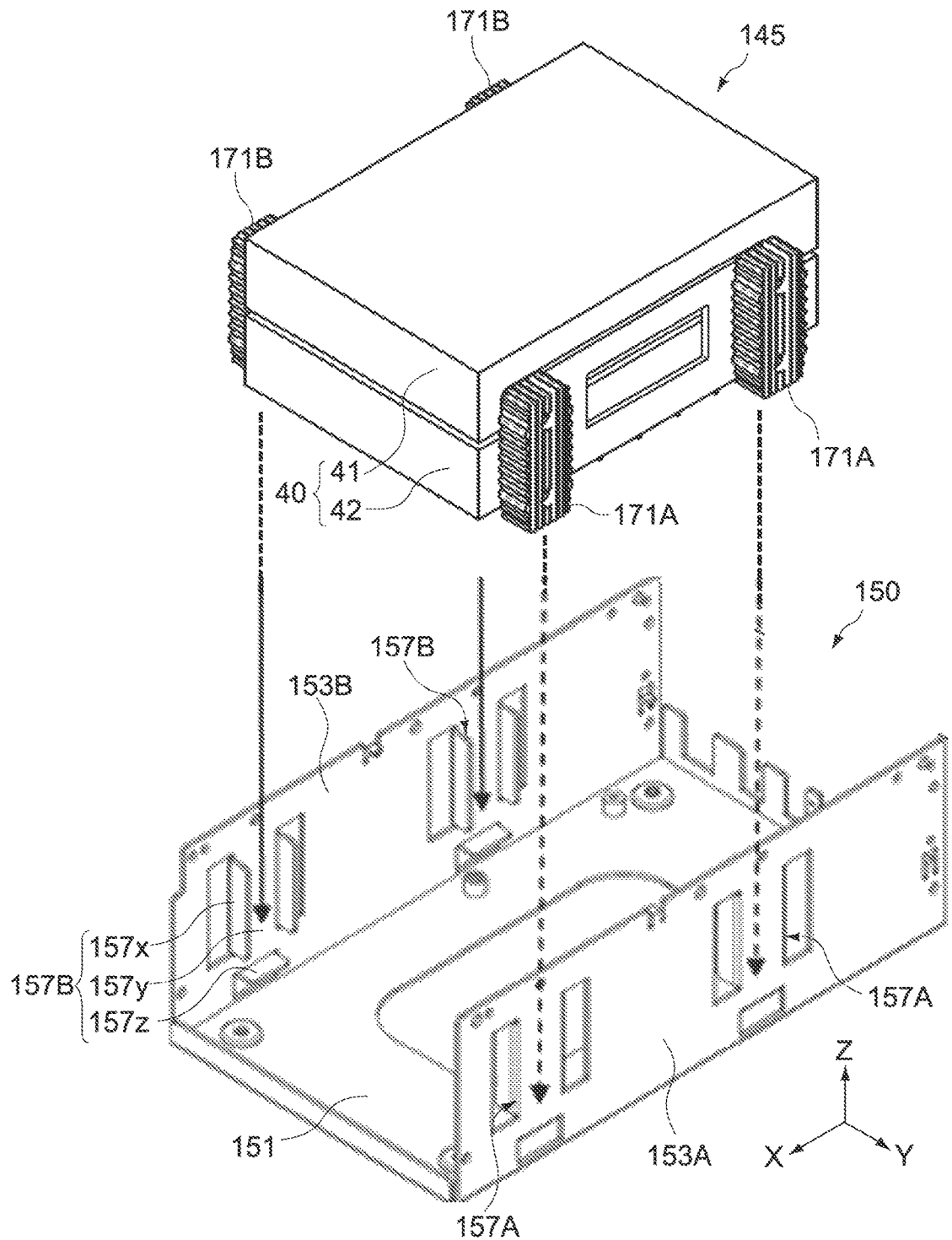
FIG. 19 is an exploded perspective view showing a relationship between the unit structure and the housing.
Figure 20:
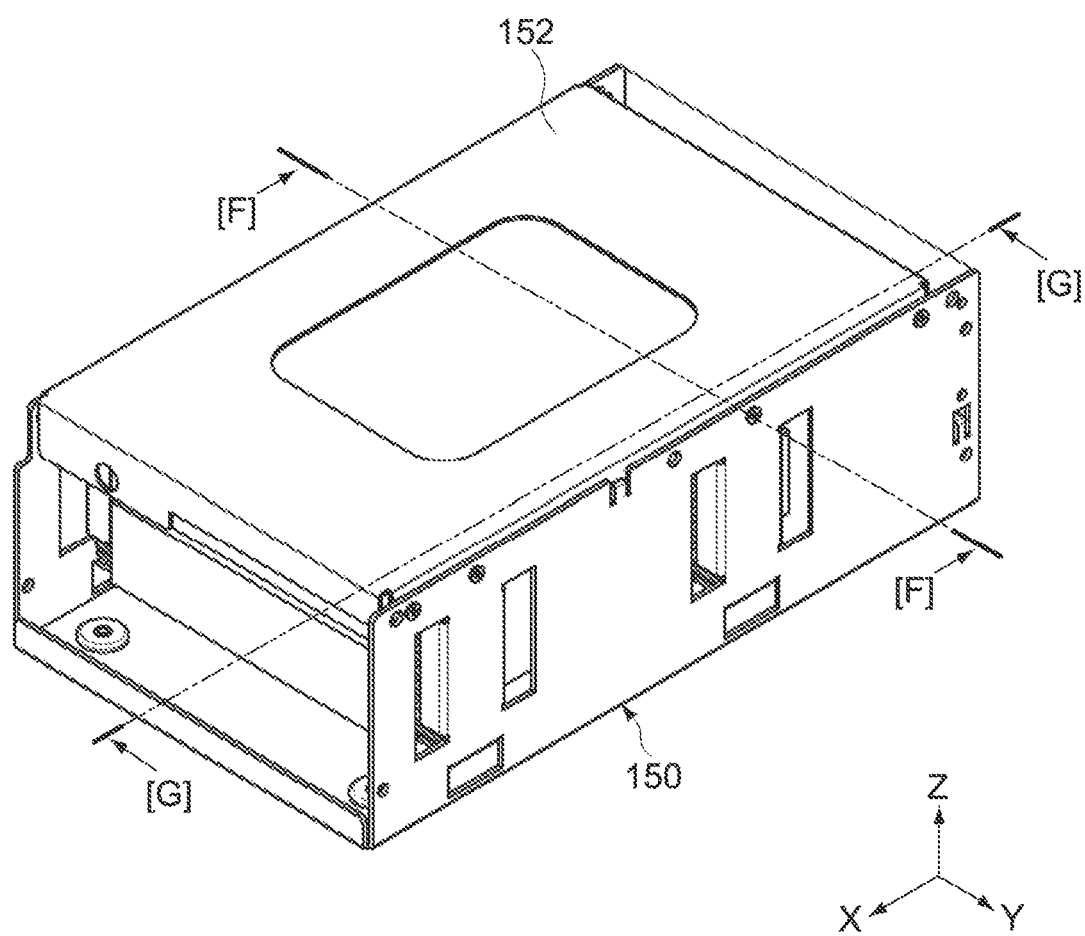
FIG. 20 is a perspective view showing the state that the unit structure is housed in the housing.

FIG. 16 is a perspective view showing an entire unit structure including a plurality of HDD units, connection members, the damping members, which are connected together, of this embodiment. FIG. 17 is a perspective view showing an attachment structure of the damping members of the unit structure, FIG. 18 is a perspective view showing the entire damping member, FIG. 19 is an exploded perspective view showing the relationship between the unit structure and the housing (inner chassis), FIG. 20 is a perspective view showing the state that the unit structure is housed in the housing (inner chassis), FIG. 21 is a cross-sectional view taken along the line [F]-[F] direction of FIG. 20, and FIG. 22 is a cross-sectional view taken along the line [G]-[G] direction of FIG. 20.

As shown in FIG. 16, a unit structure 145 according to this embodiment includes the plurality of HDD units 40, connection members 160 that connect the plurality of HDD units 40 together, and damping members 170 that elastically support the connection members 160 to the inner chassis 150 in the three-axis directions (X axis, Y axis, and Z axis directions).

Note that the inner chassis 150 is arranged inside the housing 10 similar to the first embodiment and forms a part of the housing 10.

Figure 21:
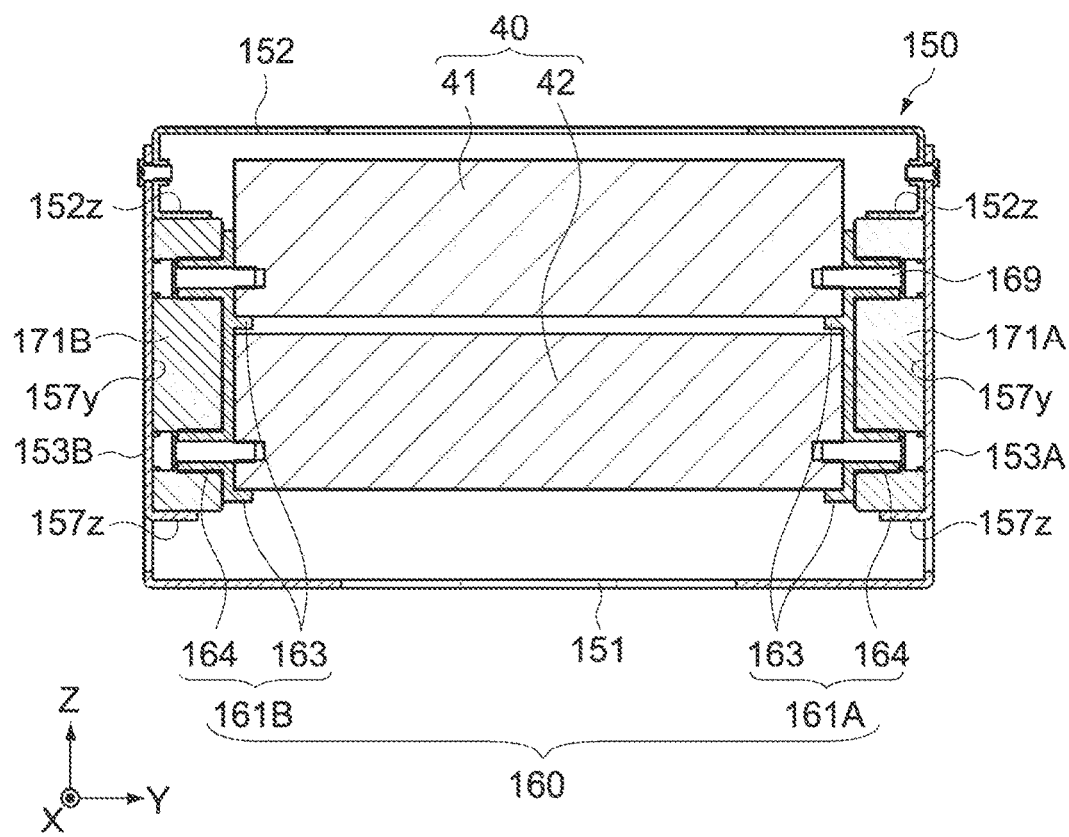
FIG. 21 is a cross-sectional view taken along the line [F]-[F] direction of FIG. 20.
Figure 22:
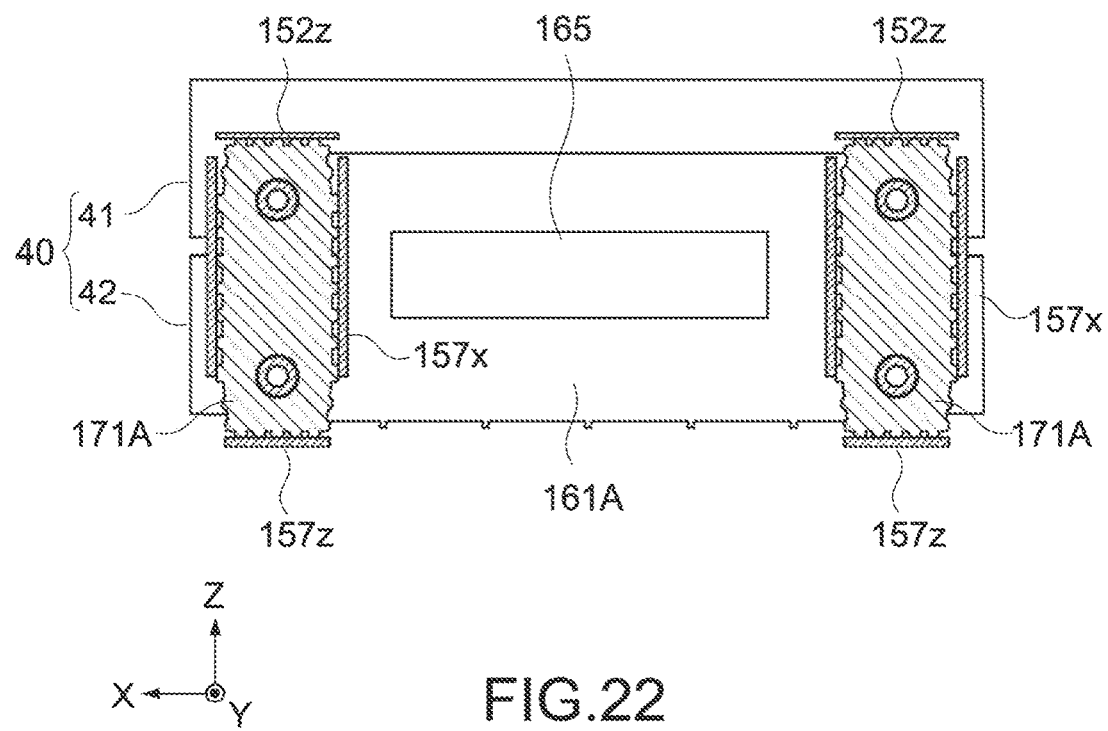
FIG. 22 is a cross-sectional view taken along the line [G]-[G] direction of FIG. 20

In this embodiment, the connection members 160 include two connection components 161A and 161B, similar to the first embodiment (see FIG. 21). One connection component 161A connects the plurality of HDD units 40 together at one side surfaces, and the other connection component 161B connects the plurality of HDD units 40 together at the other side surfaces. The connection components 161A and 161B can keep a non-contact state between the plurality of HDD units 40 and integrally hold the damping members 170, similar to the first embodiment.

The connection components 161A and 161B have the same structure, respectively. Specifically, the connection components 161A and 161B each includes a plate 162 having a substantially rectangular shape, a pair of elongated protrusions 163 formed on the plate 162 at the inner side (see FIG. 21), a plurality of bosses 164 formed on the plate 62 at four corners, and an opening 65 formed through the plate 62.

Each plate 162 is formed in a rectangular shape having long sides in the X axis direction and short sides in the Z axis direction and is fixed to each of the side surfaces of the plurality of HDD units 40 across each of the side surfaces. To fix each plate 162 and each of the HDD units 41 and 42, a plurality of screws 169 are used and inserted into each boss 164.

The pair of elongated protrusions 163 are formed in parallel in the X axis direction and protrude from an inner surface of each plate 162 to lower edge of each of the side surfaces of each of the HDD units 41 and 42. The pair of elongated protrusions 63 are for positioning the HDD units 41 and 42 and keeping a non-contact state between the HDD units 41 and 42 and are arranged each other at a distance in the Z axis direction such that a predetermined clearance is formed between the HDD units 41 and 42.

The plurality of bosses 164 are for supporting the damping members 170 and are formed in a square tube shape protruding from outer surfaces of the plates 162 to outward (side surfaces 153A and 153B sides of the inner chassis 50). At each center of the plurality of bosses 164, there is provided a through hole through which each screw 169 is inserted.

Each opening 165 is for exposing a clearance between the plurality of HDD units 40 and is arranged at the position facing to the clearance in the Y axis direction. Typically, the opening 165 is formed between the pair of elongated protrusions 163. In this embodiment, as shown in FIG. 17, the opening 165 is arranged at the center of the plate 162 and has an elongated rectangular shape having long sides in the Y axis direction.

Note that the actions of the openings 165 are similar to those of the openings 65 described in the first embodiment, and the description thereof will be omitted.

The damping members 170 elastically support the connection members 160 to the housing 10 in the three-axis (the X axis, the Y axis, and the Z axis) directions orthogonal to each other. In particular, in this embodiment, the damping members 170 have a plurality of elastic components 171A and 171B capable of elastically supporting independently the connection members 160 in all the three-axis directions.

The elastic components 171A at one end are attached to the two bosses 164 facing in the Z axis direction of one connection component 161A. The elastic components 171B at the other end are attached to the two bosses 164 facing in the Z axis direction of the other connection components 161B.

The elastic components 171A and 171B have the same structure, respectively, as shown in FIG. 18, which is a parallelepiped shape having long sides in the Z axis direction. The elastic components 171A and 171B include a plurality of grooves 172 and 173 on the surfaces and the peripheral surfaces. The grooves 172 at one end are formed along the height direction (Z axis direction) over the entire surfaces of the elastic components 171A and 171B, and the grooves 173 at the other end are formed along the thickness direction (Y axis direction) over the entire peripheral surfaces of the elastic components 171A and 171B.

The numbers, the depths, the widths, and the like of the grooves 172 and 173 are not especially limited, and are optimized so that the surfaces and the peripheral surfaces of the elastic components 171A and 171B acquire the desirable elastic force in the depth direction of the respective grooves.

The elastic components 171A and 171B each further includes two attaching holes 174 that penetrate through the thickness direction. The attaching holes 174 are arranged at a predetermined space in the Z axis direction, and, as shown in FIG. 17, can be penetrated through the two bosses 164 faced in the Z axis direction, respectively.

The depth of each attaching hole 174 is larger than the length of each boss 164, and the inner diameter of each attaching hole 174 is formed smaller than the outer diameter of each boss 164 in order to be elastically supported by each boss 164. Thus, the respective elastic components 171A and 171B are easily assembled to the respective connection components 161A and 161B, and the respective connection components 161A and 161B can integrally hold the respective elastic components 171A and 171B by using elastic forces of the respective elastic components 171A and 171B.

The elastic components 171A and 171B are formed of any non-limiting elastic materials having shock-absorbing properties and, in this embodiment, are formed of isoprene rubber having rubber hardness of about 30 degrees. Isoprene rubber has surface friction coefficient lower than that of the rubber material "SORBO" (registered trademark) used in the first embodiment, and therefore has an advantage of ease of assembly to the inner chassis 150, as described later.

In this embodiment, the two elastic components 171A are attached to the front and the back of the connection component 161A. The two elastic components 171B are attached to the front and the back of the connection component 161B. However, the numbers and the positions of the elastic components 171A and 171B are not limited thereto. Also, the number of the elastic components 171A attached to the connection component 161A may be different from the number of the elastic components 171B attached to the connection component 161B each other. For example, two elastic components may be attached to one connection component, and one elastic component may be attached to the other connection component.

The unit structure 145, in which the plurality of HDD units 40 are integrated with the connection components 161A and 161B and the elastic components 171A and 171B are mounted to the connection components 161A and 161B, is housed in the space of the inner chassis 150 (see FIG. 19). Four support portions 157A and 157B supporting the elastic components 171A and 171B, respectively, are formed in both side surfaces 153A and 153B of the inner chassis 150.

As shown in FIG. 19, the support portions 157A and 157B are integrally formed with the side surfaces 153A and 153B of the inner chassis 150, and each of the support portions 157A and 157B has a pair of flaps 157$x$, a surface 157$y$, and a flap 157$z$.

The pair of flaps 157$x$ are arranged perpendicular to the side surface 153A, 153B, are faced to each other in the X axis direction, and come in elastically contact with peripheral surfaces (both sides) of the elastic component 171A, 171B in the X axis direction. The surface 157$y$ is formed of a part of the inner surface of the side surface 153A, 153B, is positioned between the pair of flaps 157$x$, and comes in contact with the surface of the elastic component 171A, 171B in the Y axis direction. The flap 157$z$ is arranged perpendicular to the side surface 153A, 153B, and comes in elastically contact with peripheral surface (lower end) of the elastic component 171A, 171B in the Z axis direction. Thus, the connection components 161A and 161B and the plurality of HDD units 40 are elastically supported by the inner chassis 150 via the elastic components 171A and 171B.

At this time, the respective flaps 157$x$, surface 157$y$, and flap 157$z$ of the support portions 157A and 157B are fixed to the respective connection components 161A and 161B via the elastic components 171A and 171B. Accordingly, the support portions 157A and 157B also function as regulators that regulate movements of the connection members 61A and 61B toward the inner chassis 50 along the three-axis (X axis, Y axis, and Z axis) directions. As a result, relative movements of the HDD units 41 and 42 in the housing 10 are regulated to suppress misalignment and the HDD units 41 and 42 can be stably protected from a shock.

In addition, since the elastic components 171A and 171B are formed of the rubber material having low surface friction coefficient, and the plurality of grooves 172 and 173 are formed on the surfaces and the peripheral surfaces, the unit structure 145 can be smoothly mounted to the side surfaces 153A and 153B of the inner chassis 150. Thus, operability can be improved. In addition, in this embodiment, no screws are required to connect the unit structure 145 to the side surfaces 153A and 153B of the inner chassis 153. Thus, an assembly operation can be further improved.

After the unit structure 145 is mounted to the side surfaces 153A and 153B of the inner chassis 150, a top surface 152 of the inner chassis 150 is attached (FIG. 20). The top plate 152 includes a plurality of pressing pieces 152$z$ that come in elastically contact with upper ends of the respective elastic components 171A and 171B (see FIG. 21 and FIG. 22). Accordingly, after the top plate 152 is assembled, the respective elastic components 171A and 171B are elastically sandwiched between the flaps 157$z$ of the support portions 157A and 157B and the pressing pieces 152$z$ in the Z axis direction.

As described above, this embodiment can also provide functions and effects similar to those of the above-described first embodiment. Specifically, since the respective HDD units 41 and 42 are elastically supported by the damping members 170 (elastic components 171A and 171B) arranged between the inner chassis 150 and the connection members 160 (connection components 161A and 161B) in the three-axis directions, it is possible to avoid increasing the size of the device and to protect the HDD units 41 and 42 from a shock.

In particular, according to this embodiment, since the elastic components 171A and 171B independently have the shock-damping properties in the three-axis directions, the number of components mounted to the connection components 161A and 161B can be significantly decreased.

While the embodiments of the present technology are described above, it should be understood that the present technology is not limited to the above-described embodiments and various changes may be made.

For example, in the above-described embodiments, the HDD apparatus including the two HDD units 41 and 42 is illustrated. The number of the HDD unit is not limited thereto and may be three or more.

In addition, as the electronic device, the HDD apparatus including the plurality of HDD units is illustrated, which is not limited thereto. The present technology is also applicable to an optical disk apparatus including drive units such as an optical disk and a magneto-optical disk.

The present technology may also have the following structures.

(1) An electronic device, including:
a plurality of disk drive units;
a housing that houses the plurality of disk drive units;
a connection member that keeps a non-contact state between the plurality of disk drive units and connects the plurality of disk drive units together; and a damping member arranged between the housing and the connection member that elastically supports the connection member to the housing in three-axis directions orthogonal to each other.

(2) The electronic device according to (1), in which
the housing has a regulator that is in contact with the damping member and regulates a movement of the connection member toward the housing along the three-axis directions.

(3) The electronic device according to (1) or (2), in which
the damping member has a plurality of first elastic components capable of elastically supporting independently the connection member in the two-axis directions of the three-axis directions, and a plurality of second elastic components capable of elastically supporting the connection member in the other one-axis direction of the three-axis directions.

(4) The electronic device according to (1) or (2), in which
the damping member has a plurality of elastic components capable of elastically supporting independently the connection member in all the three-axis directions.

(5) The electronic device according to (4), in which
the connection member has a boss, and
the plurality of elastic components each has an attaching hole that is deeper than the length of the boss and has an inner diameter smaller than an outer diameter of the boss.

(6) The electronic device according to any one of (1) to (5), in which
the plurality of disk drive units each has a first side surface orthogonal to the first axis direction and a second side surface opposite to the first side surface,
the connection member has a first connection component that connects the plurality of disk drive units together on the first side surface and a second connection component that connects the plurality of disk drive units together on the second side surface, and
the damping member is attached to the first connection component and the second connection component.

(7) The electronic device according to any one of (1) to (6), further including:
an outer cover that is mounted to the housing and has hardness higher than hardness of the damping member.

(8) The electronic device according to (7), in which
the housing has a hexahedron structure,
the outer cover has a plurality of openings that expose a part of each surface of the housing and a plurality of bridge parts that cover edge line parts of the housing.

(9) The electronic device according to any one of (1) to (8), further including:
a fan arranged inside the housing and being capable of cooling the plurality of disk drive units, wherein the connection member has an opening that exposes a clearance between the plurality of disk drive units.

(10) The electronic device according to any one of (1) to (9), further including:
a handle member attached to an outer surface of the housing.

REFERENCE SIGNS LIST

10 housing
20 outer cover
30 handle member
40, 41, 42 HDD unit
50, 150 inner chassis
60, 160 connection member
61A, 61B, 161A, 161B connection component
70, 170 damping member
71A, 72A, 171A, 171B elastic component
100 electronic device

The invention claimed is:

1. An electronic device, comprising:
a plurality of disk drive units;
a housing that houses the plurality of disk drive units;
a connection member that keeps a non-contact state between the plurality of disk drive units and connects the plurality of disk drive units together; and
a damping member between the housing and the connection member, wherein
the damping member is configured to elastically support the connection member to the housing in three-axis directions orthogonal to each other,
each of the plurality of disk drive units includes a first side surface and a second side surface opposite to the first side surface,
each of the first side surface is orthogonal to a first axis direction of the three-axis directions,
the connection member includes a first connection component and a second connection component,
the first connection component connects the plurality of disk drive units on the first side surfaces,
the second connection component connects the plurality of disk drive units on the second side surfaces, and
the damping member is in contact with each of the first connection component and the second connection component.

2. The electronic device according to claim 1, wherein
the housing includes a regulator that is in contact with the damping member, and
the regulator is configured to regulate, along the three-axis directions, movement of the connection member toward the housing.

3. The electronic device according to claim 1, wherein
the damping member includes:
a plurality of first elastic components configured to elastically support the connection member in two-axis directions of the three-axis directions; and
a plurality of second elastic components configured to elastically support the connection member in the other one-axis direction of the three-axis directions, wherein the other one-axis direction is different from the two-axis direction.

4. The electronic device according to claim 1, wherein the damping member includes a plurality of elastic components configured to elastically support the connection member in each of the three-axis directions.

5. The electronic device according to claim 4, wherein the connection member has a boss, and
the plurality of elastic components each has an attaching hole that is deeper than a length of the boss and has an inner diameter smaller than an outer diameter of the boss.

6. The electronic device according to claim 1, further comprising an outer cover mounted to the housing,
wherein a hardness of the outer cover is higher than a hardness of the damping member.

7. The electronic device according to claim 6, wherein the housing has a hexahedron structure, and the outer cover includes:
a plurality of openings that exposes a part of each surface of the housing; and
a plurality of bridge parts that covers edge line parts of the housing.

8. The electronic device according to claim 1, further comprising
a fan inside the housing,
wherein
the fan is configured to cool the plurality of disk drive units, and
the connection member includes an opening that exposes a clearance between the plurality of disk drive units.

9. The electronic device according to claim 1, further comprising a handle member, wherein the handle member is in contact with an outer surface of the housing.

* * * * *